US008019841B2

(12) United States Patent
Ellis et al.

(10) Patent No.: US 8,019,841 B2
(45) Date of Patent: Sep. 13, 2011

(54) ZONING FOR DISTANCE PRICING AND NETWORK ENGINEERING IN CONNECTIONLESS AND CONNECTION-ORIENTED NETWORKS

(75) Inventors: Donald Russell Ellis, Ottawa (CA); Martin Charbonneau, Hull (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 901 days.

(21) Appl. No.: 10/741,988

(22) Filed: Dec. 19, 2003

(65) Prior Publication Data

US 2005/0071454 A1    Mar. 31, 2005

Related U.S. Application Data

(60) Provisional application No. 60/507,278, filed on Sep. 30, 2003.

(51) Int. Cl.
*G06F 15/173* (2006.01)

(52) U.S. Cl. ............................ 709/223; 709/225; 709/229

(58) Field of Classification Search .................. 709/200, 709/223–226, 229; 370/230, 910, 912
See application file for complete search history.

(56) References Cited

U.S. PATENT DOCUMENTS

| | | | |
|---|---|---|---|
| 6,222,848 B1 | 4/2001 | Hayward et al. | |
| 6,343,085 B1 * | 1/2002 | Krishnan et al. | 370/468 |
| 6,456,839 B1 * | 9/2002 | Chow et al. | 455/408 |
| 6,766,168 B1 * | 7/2004 | Lim | 455/435.1 |
| 6,788,681 B1 * | 9/2004 | Hurren et al. | 370/389 |
| 6,948,000 B2 * | 9/2005 | Desai et al. | 709/245 |
| 6,954,630 B2 * | 10/2005 | Offer | 455/406 |
| 6,980,524 B1 * | 12/2005 | Lu et al. | 370/254 |
| 6,982,963 B2 * | 1/2006 | Asahina | 370/310 |
| 7,065,062 B2 * | 6/2006 | Madour et al. | 370/331 |
| 7,126,952 B2 * | 10/2006 | Hooper et al. | 370/401 |
| 7,181,193 B2 * | 2/2007 | Ansamaa | 455/406 |
| 2003/0078042 A1 * | 4/2003 | Miriyala et al. | 455/435 |
| 2003/0120765 A1 | 6/2003 | Radi et al. | |
| 2003/0125031 A1 * | 7/2003 | Sung Lim et al. | 455/447 |
| 2003/0131028 A1 | 7/2003 | Radi et al. | |
| 2004/0008702 A1 * | 1/2004 | Someya et al. | 370/401 |
| 2008/0176577 A1 * | 7/2008 | Bourlas et al. | 455/454 |

* cited by examiner

*Primary Examiner* — Faruk Hamza

(74) *Attorney, Agent, or Firm* — Guerin & Rodriguez, LLP; Michael A. Rodriguez

(57) ABSTRACT

Described are a system and method for establishing zone-based pricing for services transported over connectionless and connection-oriented networks. The connectivity network supporting the service is partitioned into one or more zones. A node connected to a packet transport network receives a packet associated with the service. The packet has information that is used to identify one of the zones of the connectivity network to which the packet can be transmitted. Service providers are thus able to use zoning to apply a pricing structure for services traditionally lacking distance-based pricing, such as Ethernet, Storage, and Internet Protocol services.

25 Claims, 5 Drawing Sheets

ZONING FOR DISTANCE PRICING AND NETWORK ENGINEERING IN CONNECTIONLESS AND CONNECTION-ORIENTED NETWORKS

RELATED APPLICATION

This application claims the benefit of the filing date of U.S. Provisional Application Ser. No. 60/507,278, filed Sep. 30, 2003, titled "Structured Addressing for Optical Service and Network Management Objects," the entirety of which provisional application is incorporated by reference herein.

FIELD OF THE INVENTION

The invention relates generally to communications systems. More particularly, the invention relates to a system and method of defining zones in a communications network that are useful for pricing services transported across the communications network and for engineering the network resources of the communications network to support the services.

BACKGROUND

Ethernet technology has become ubiquitous in local area networks (LANs) of many businesses and residences. In increasing numbers, service providers and carriers are offering Ethernet services to their customers, and transporting service traffic over connection-oriented and connectionless networks. Examples of connectionless packet-based networks include Ethernet LANs and Internet Protocol (IP) networks (e.g., the Internet). Connectionless networks pose a difficulty for service providers to appropriately price their offered services, in part because the actual routes taken by individual packets of the service traffic are unknown.

In connectionless networks, the transmission of packets between nodes does not require previously establishing a communication path between the nodes. Packets are individually routed to their destination through the network over a best route (based on a routing algorithm). Conceivably, packets traveling from the same source node to the same destination node, whether part of the same or of different messages, do not necessarily follow the same route through the network. The destination node reassembles the packets into their appropriate sequence to produce the message.

The inability to know beforehand the routes taken by the packets makes it difficult to predict with any significant precision which particular network resources will handle the service traffic. Consequently, service providers are unable to predict, with much certainty, their cost for carrying service traffic for specific services. Often the pricing of their Ethernet and IP services is not directly related to the costs for handling the service traffic. Service providers are, therefore, searching for a mechanism that helps them price their Ethernet and IP services appropriately, especially for their connectionless packet-based networks.

One common pricing technique is to charge according to supported bit rate for the service. A variation of this technique is to charge by the number of transmitted packets (or octets) of the service as counted by a node in the network. Although these techniques provide a basis for pricing services, they neglect to consider the network resources necessary to deliver the packets to their destination. For instance, transmitting two million packets across a city uses far fewer network resources than transmitting the same number of packets across a continent. Counting packets, by itself, ignores distance, and thus does not provide an accurate valuation of the true cost to support the service.

Moreover, these techniques do not enable network management to properly design (i.e., engineer) the network to support the service. Whereas counting packets gives an indication of the capabilities needed by a particular node to support the service, the route taken by individual packets associated with a service is effectively unknown. From bit rate and packet counts alone, service providers are unable to deploy network resources cost-effectively for carrying the service traffic to its destination.

Another variation of this counting technique is IP filtering. Nodes employing IP filtering count packets and can block packets from passing therethrough based on IP addressing of the packets. To use IP filtering to account for distance, however, service providers need to associate different IP destination address with different distances. Implementing IP filtering is therefore difficult to engineer, in particular in large networks having thousands of nodes and other network resources. Thus, there is a need for a system and method that enable service providers to more predictably associate costs with their offered services so that they can more cost-effectively engineer their networks and price their services.

SUMMARY

In one aspect, the invention features a method for establishing zone-based pricing for a service transported over a connectionless network. The connectionless network is partitioned into one or more zones. A node connected to the connectionless network receives a packet associated with the service. The packet has information from which the node can identify one of the zones of the connectionless network to which the packet can be transmitted.

In another aspect, the invention features a method for establishing zone-based pricing for a service transported over a network. The network is partitioned into one or more zones. A node connected to the network receives a packet associated with the service. The packet has a tag including a plurality of bits for identifying an Ethernet virtual local area network (VLAN) for the packet. A portion of the bits is used to identify one of the zones of the network to which the packet can be transmitted.

In yet another aspect, the invention features a network having a plurality of zones and a node located in one of the zones. The node receives packets associated with a service transported over the network. The node determines for each packet one of the plurality of zones to which the packets can be transmitted.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Networks implementing zoning of the present invention provide service providers and carriers with a mechanism for establishing network-cost based and distance-based pricing for their Ethernet, Storage, and Internet Protocol (IP) packet services carried over a connectionless or a connection-oriented network. A service, as used herein, is a guarantee of transport of customer-offered traffic with specific performance commitments. A connectionless network, as used herein, signifies a network employing a communications architecture that does not require a communication path to be previously established between source and destination nodes before transmitting data.

In brief overview, the mechanism entails providing each packet of the service traffic with an indicator that represents an expected traveling distance for the packet. As used herein, a packet is a basic unit of communication in the connectionless network (and used synonymously with frame). Service providers associate this expected traveling distance with a cost. Nodes can count packets with these indicators, to provide information about the volume, rate, and distance of the service traffic. Thus, the distance-based pricing of the invention provides a measure of predictability for transporting packets over the connectionless network. Not only are service providers able to match service pricing more accurately with service cost, but also to deploy their network resources more precisely for supporting the traffic volumes of its services.

Figure 1:
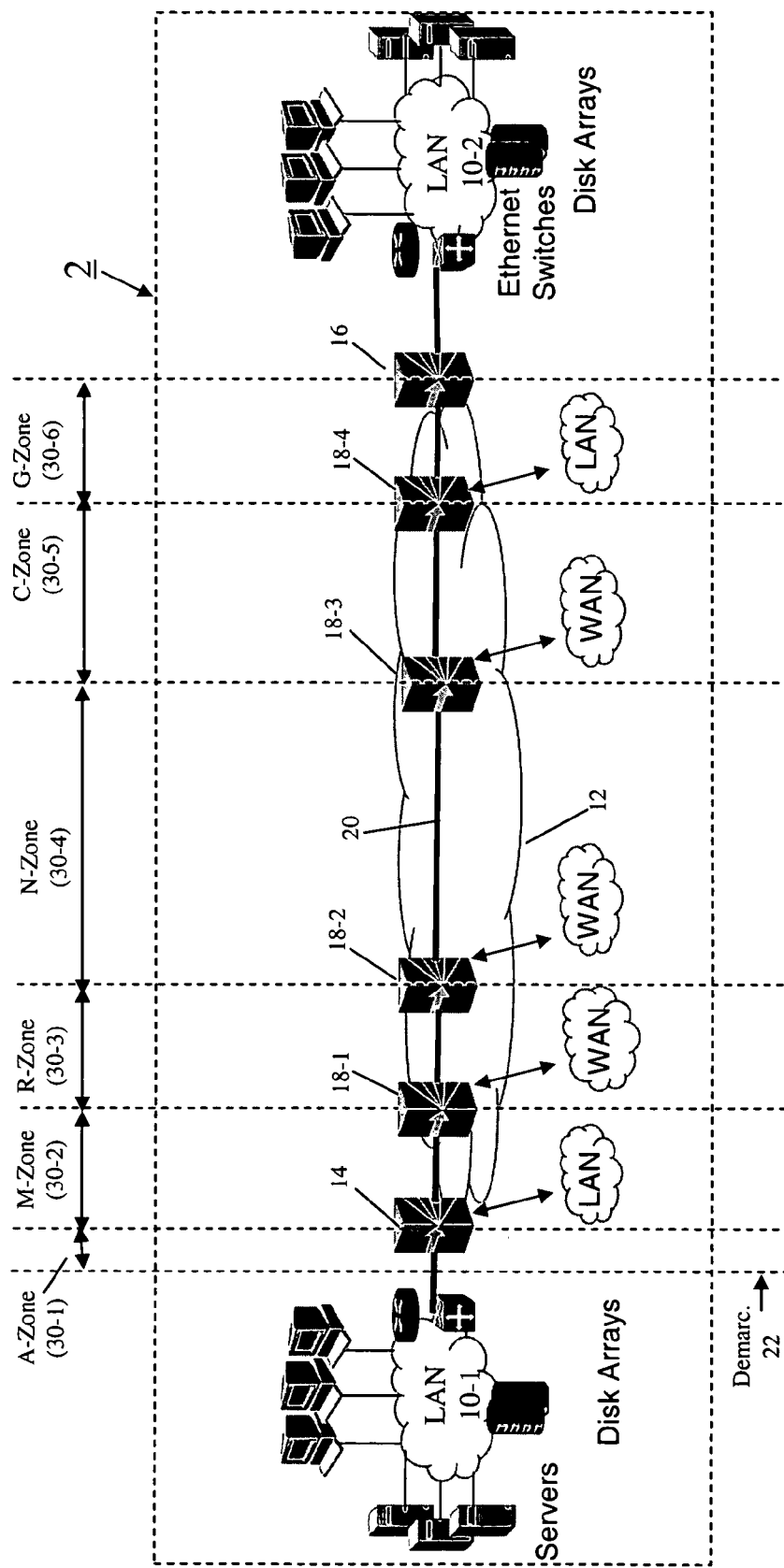
FIG. 1 is a block diagram of an embodiment of a network of networks including a plurality of local area networks (LANs) and wide area networks (WANs) and a service provider network that carries service-traffic between the LANs and WANs, the service provider network being partitioned into a plurality of zones in accordance with the invention.

FIG. 1 shows an embodiment of a network of networks 2 constructed in accordance with the principles of the invention. The network of networks 2 includes a plurality of local area networks 10-1, 10-2 (generally, LAN 10) and a service provider (SP) network 12 that carries service traffic between the LANs 10. Services supported by the present invention include IP services, Ethernet services (e.g., 10/100/1000), and Fiber Channel. The present invention can support other types of packet-based service traffic. Each LAN 10 includes, for example, storage arrays, servers, computer systems, and Ethernet switches. The LANs 10, also referred to herein as client networks, originate and terminate the customer service traffic passing over the SP network 12. Although described with reference to the LANs 10, the principles of the invention apply also to carrying traffic between storage areas networks (SANs) across the SP network 12.

In one embodiment, the SP network 12 is a connectionless network (e.g., a local area network (LAN), metro-area network (MAN), or wide-area network (WAN). Examples of connectionless networks include IP networks, such as the Internet, private LANs and SANs, and private LAN enterprises. The SP network 12 can itself be a network of networks, spanning a plurality of different service providers and carriers and including both connectionless and connection-oriented sub-networks (although the advantages of the distance-based pricing of the invention are more realized in connectionless networks).

The SP network 12 has a variety of network resources, including a near-end edge service node or network element NE 14 in communication with a far-end edge-service network element NE 16 through a plurality of intermediate or core network elements NE 18-1, 18-2, 18-3, and 18-4 (generally, core NE 18). Transmission of service traffic among the NEs 14, 16, 18 is over a transport facility 20. In one embodiment, the transport facility 20 is an optical transport facility based on a synchronous data transmission standard such as Synchronous Optical Network (SONET), Synchronous Digital Hierarchy (SDH), or Optical Transport Network (OTN)). Transmission of Ethernet services over an optical transport facility is referred to as Optical Ethernet. Other types of transport facilities than optical transport can be used, such as wired or wireless transport, without departing from the principles of the invention. In this embodiment, the SP network 12 also includes a network interface unit (not shown) at the demarcation point, to interface between customer service traffic and the SP network 12.

Figure 2:
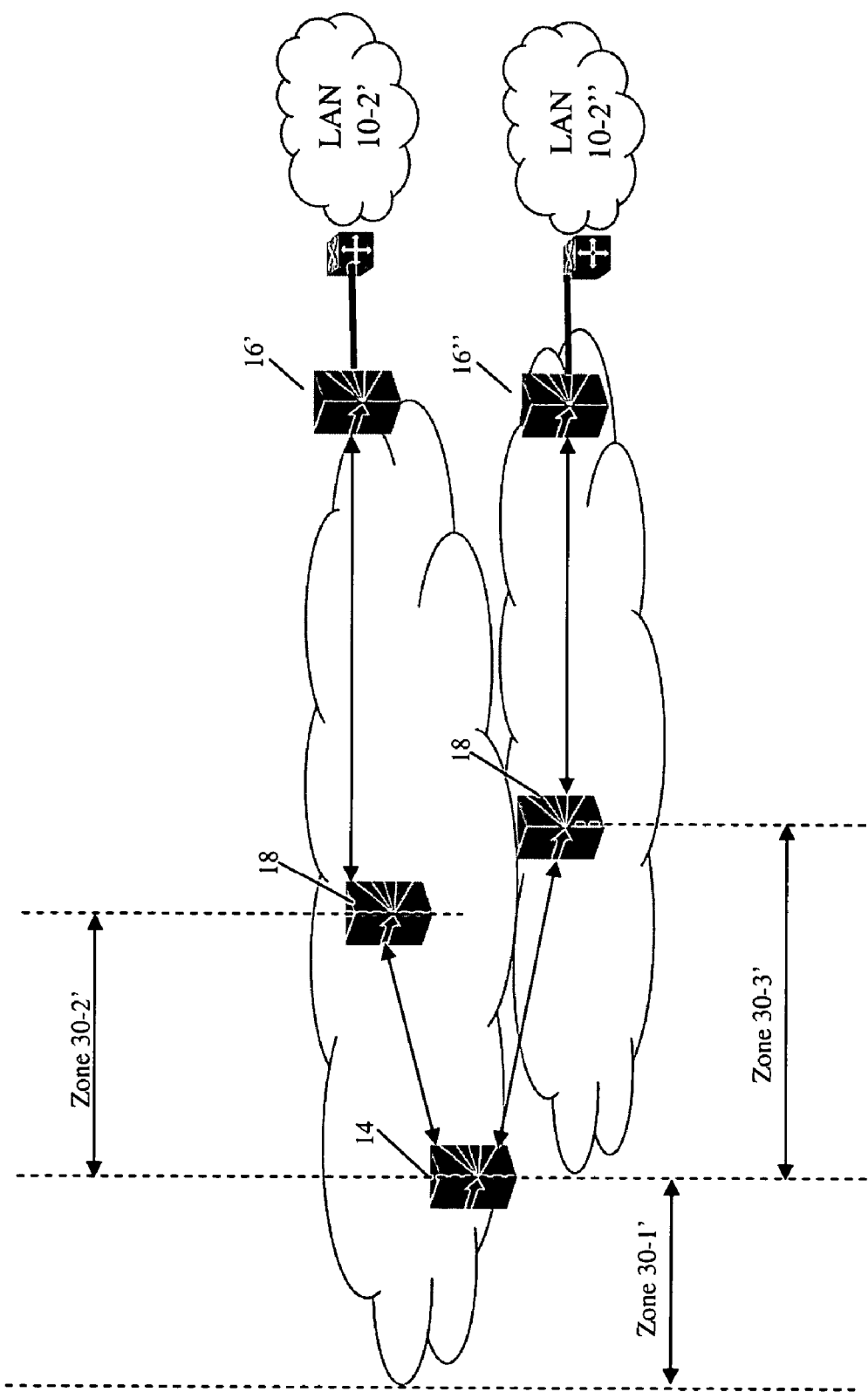
FIG. 2 is a block diagram of an embodiment of a service provider network having a plurality of zones defined in a parallel arrangement.

The SP network 12 is partitioned into a plurality of zones 30-1, 30-2, 30-3, 30-4, 30-5, and 30-6 (generally, zone 30). The use of six zones is illustrative; fewer or more than six zones are possible without departing from the principles of the invention. Further, the linear arrangement of zones is also illustrative. The invention applies also to parallel zone arrangements (see FIG. 2, in which zone 30-2' is parallel to zone 30-3') and to combinations of linear and parallel zone arrangements. The defining of zones is within the discretion of the service provider. In one embodiment, zones are defined based on distance from the source of the service traffic (i.e., LAN 10-1). In other embodiments, zones are based on the operating costs of network resources in that zone (e.g., some zones may be closer in distance to the service traffic source than other zones, yet more costly to operate), on engineering considerations, or combinations thereof. In still other embodiments, zones correspond to different service providers (e.g., the NEs 18 are situated at carrier network hand-off points).

Returning to FIG. 1, in one embodiment, the six zones 30 are defined respectively as 1) an access zone 30-1 (A-zone); 2) a metro-zone 30-2 (M-zone); 3) a regional zone 30-3 (R-zone); 4) a national zone 30-4 (N-zone); 5) a continental zone 30-5 (C-zone); and 6) a global zone 30-6 (G-zone). The access zone 30-1 is the area where connectivity between the client and service provider is established. The particularity of the access zone 30-1 is that no distance is associated with it. Within the access zone 30-1, client services are locally switched or forwarded to the M-zone 30-2 (and from there to other zones, if needed) In this exemplary arrangement of zones, the distance between the LAN 10-1 and the LAN 10-2 spans six zones, and thus service traffic exchanged between the LANs traverses six zones. To implement zoning, each core NE 18 resides at a boundary between zones 30 and operates to permit service traffic to pass from one zone to the other or to restrict service traffic to a LAN (or SAN) within a particular zone.

Service providers can offer a service to a customer that involves different zones and then price the service accordingly based on the various bandwidth rates allocated to the service traffic passing through each of the zones. For example, consider a service in which the service provider offers a 200 Mbps service rate to M-zone 30-2, a 50 Mbps service rate to N-zone 30-4, and a 2 Mbps service rate to G-zone 30-6. Not only can the service provider allocate its network resources to support this particular mixture of bandwidth rates, but also establish pricing for the service commensurate with the cost of those network resources. By helping the service provider understand and control utilization of network resources, zoning also enables the service provider to design or engineer the network.

In brief overview, packets of service traffic arrive at the near-end NE 14 containing service-identifying information. The client network (i.e., LAN 10-1) adds the service-identifying information to each packet based upon the type of service purchased by the customer. The NE 14 receiving the client packets determines from the service-identifying information the zone to which the service traffic can travel, e.g., by using the service-identifying information to index into a table or database to find the zone with the service. For the NE 14 to make this association between a service and a zone, zoning information associating the service with the zone is forwarded to and stored at the NE 14. This process of associating a service instance to a zone occurs either by pre-provisioning or dynamic signaling. (The far-end NE 16 is similarly configured.) The NE 14 forwards the packets toward their destinations (e.g., routed to the next node in the connectionless network 12). In a circuit-oriented network, the NE 14 sends the packets over a predetermined path.

The NEs 18 in the path of the service traffic can be "service agnostic" or "service aware." Service-agnostic NEs 18 rely on zoning information (e.g., a zone indicator) explicitly included in the packets of the service traffic. In embodiments utilizing service-agnostic NEs 18, the NE 14 adds a zone indicator to each packet before forwarding the packet. Accordingly, each NE 18 between the source and destination nodes can use the zone indicator to determine whether to forward, bridge, switch, or route the packets; the particular operation depending upon the technology employed. In general, the NEs 18 use the zone indicator to restrict packets from passing beyond their authorized zone. For example, in FIG. 1 the zones increase in scope from the A-zone to the G-zone. For service traffic to pass from LAN 10-1 to LAN 10-2, each packet requires a global zone indicator. For example, the NE 18-4 blocks packets targeted to zones of lesser scope than the G-zone 30-6 from traveling the entire distance between the LANs 10. As another example, packets targeted to the M-zone 30-2 are limited to LANs and SANs within the metro-zone and do not traverse beyond the core NE 18-1 into the R-zone 30-3.

Service-aware NEs 18 maintain a lookup table for associating services with zones and operate to restrict packets within their assigned zones with or without an explicit zone indicator included in the packets. To determine whether to forward a given packet in the absence of an explicit zone indicator, a service-aware NE 18 uses service-identifying information included in the packet (inserted into the packet by the NE 14 or by the client network). Each such NE 18 uses the service-identifying information to access the lookup table to find the associated zone. The zoning information that associates each service with a zone, and is stored in the lookup table, can be sent to the NEs 18 by pre-provisioning or dynamic signaling.

As described above, the client network 10-1 includes certain information in each packet of the service traffic to enable the NE 14 to determine the zone with which the service is associated. One embodiment for providing this service-identifying information uses existing Ethernet Virtual Local Area Network (VLAN) technology. VLANs enable logical grouping of user systems that are geographically dispersed. For tag-based Ethernet VLANs, the packet has a MAC header that includes a tag, called a q-tag, with a plurality of bits for identifying the VLAN group membership (VLAN ID). Q-tags are used, in general, to identify priority (i.e., QoS or quality of service) and to provide the VLAN ID. In accordance with the invention, bits of the VLAN ID of the q-tag also identify the type of service (ToS). From the customer-provided VLAN ID bits, the NE 14 identifies the service and, then, associates the service to a zone.

These examples are merely illustrative of techniques by which the customer can include the identity of the service within the packets of the service traffic. In general, the identity can be included at any one or combination of networking layers (e.g., layer 1, layer 2, and layer 3). For example, one skilled in the art will recognize other ways of providing an instance of the service in the packets, such as using a combination of the customer VLAN ID and the customer p-bits. As another example, the service instance can be represented by a combination of the IP subnet and the TCP port number. As yet additional examples, the service instance can be included in MPLS tunnel labels and Pseudo-Wire Emulation Virtual Channel (PWE VC) labels.

Further, a zone indicator can also be explicitly included in each packet at any one or combination of networking layers (e.g., layer 1, layer 2, layer 3) to enable service-agnostic NEs 18 to determine the zone. For example, the NE 14 adds a second VLAN ID to each packet, referred to as the service provider VLAN ID, which serves as the zone indicator.

The following table, Table 1, presents an example of q-tag values added by the client network 10-1 and by the SP network 12, corresponding to specific zones, distances associated with each zone, and a pricing structure for the zones:

TABLE 1

| Client Q-tag value (i.e., VLAN ID) | SP Q-tag value (i.e., VLAN ID) | Zone Indicated | Example of Distance (in km) | Example of Pricing Structure for 1 Mb/s Service |
|---|---|---|---|---|
| 10 | 100 | Internet access | | |
| 20 | 200 | A-zone | | Priced by port |
| 30 | 300 | M-zone | 1,000 > x > 100 | Lowest level pricing |
| 40 | 400 | R-zone | 10,000 > x > 1,000 | Second level pricing |
| 50 | 500 | N-zone | 50,000 > x > 10,000 | Third level pricing |
| 60 | 600 | C-zone | 100,000 > x > 50,000 | Fourth level pricing |
| 70 | 700 | G-zone | >100,000 | Highest level pricing |

Multiple q-tag values can be associated with each zone to distinguish among the types of services for that zone. For example, a q-tag value of 100 can be used to represent the M-zone for an eWire service (point-point), a q-tag value of 600 for an eFrame service (point-to-multipoint), and a q-tag value of 700 to represent a eLAN service (any point to any point). In addition to the price differential based on distances (zones), different types of services can be priced differently.

Figure 3:
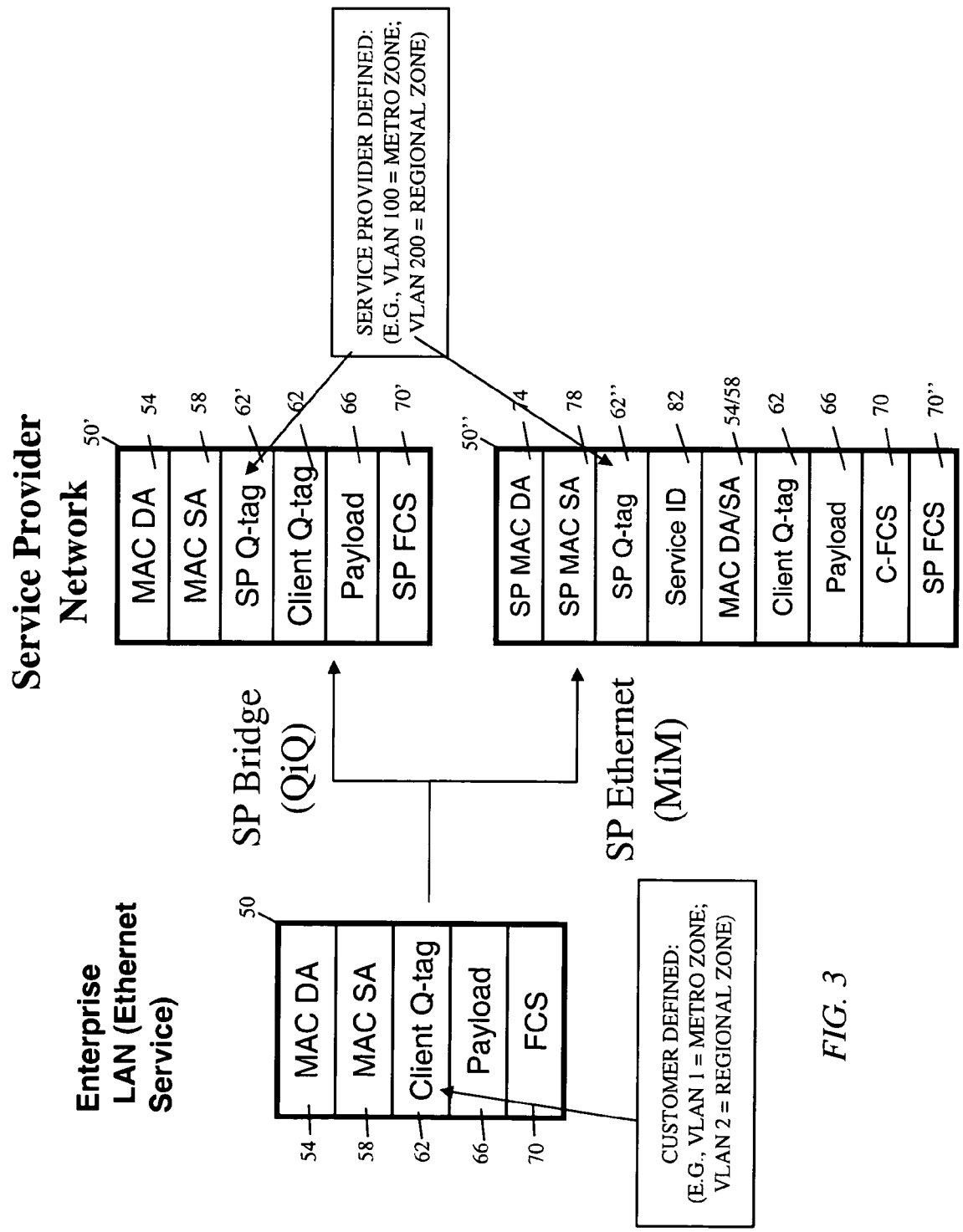
FIG. 3 is a diagram illustrating an embodiment of a packet structure for conveying zoning information over a service provider network in accordance with the principles of the invention.

FIG. 3 shows an embodiment of a layer 2 implementation of signaling the zone indicator that exploits existing Ethernet VLAN technology. An Ethernet packet 50 associated with a service originates from the LAN 10-1 and includes a destination Media Access Control (MAC) address 54 (MAC DA), a source MAC address 58 (MAC SA), a client q-tag 62, payload 66, and a frame check sequence 70 (FCS). The client q-tag 62 identifies the service type, client frames, and attributes, using the q-bits to identify the type of service (ToS) and the p-bits for class of service (CoS) and quality of service (QoS).

In one embodiment, referred to as SP Bridge QiQ, the near-end NE 14 of the SP network 12 inserts an SP network q-tag 62' into the packet 50, replacing the client FCS 70 with the an SP FCS field 70', to produce a packet 50". The SP q-tag 62' includes the service ID associated with the customer's service and, optionally, a copy of the zone indicator (e.g., SP VLAN ID). Usage of the SP VLAN ID as the zone indicator enables the network elements in the data path (e.g., Ethernet switches) to perform zone containment of packets without needing to know which service the packets belong to.

In another embodiment, referred to as SP Ethernet MiM, the near-end NE 14 encapsulates the contents of packet 50 within a packet 50". The packet 50" includes an SP MAC destination address 74, an SP MAC source address 78, an SP q-tag 62", a service ID 82, and an SP FCS 70". The SP MAC destination and source addresses 74, 78, the SP q-tag 62" and service ID 86 are added at the front of the header of the packet 50 and the SP FCS 70" appended to end of the packet 50. The SP q-tag 62" includes the zone indicator; the service ID 82 the identity of the service instance. In the QiQ embodiment, the SP FCS field 70' replaces the client FCS 70. In the MiM embodiment, the SP FCS field 70" is appended to the packet 50". The structure of the packet 50" separates the SP network 12 addressing from the client LAN addressing.

Other techniques than those described above for indicating the zone by the SP network 12 can be used. For example, the SP network can embody the zone indicator in a Multi-protocol Label Switch (MPLS) label. Different MPLS labels can indicate different zone terminations. The packets can then be transported over existing asynchronous transfer mode (ATM) and frame-relay networks. The nodes within these networks can determine from the zone indicator provided in the MPLS label how to route and restrict the packets to their appropriate zone.

Figure 4:
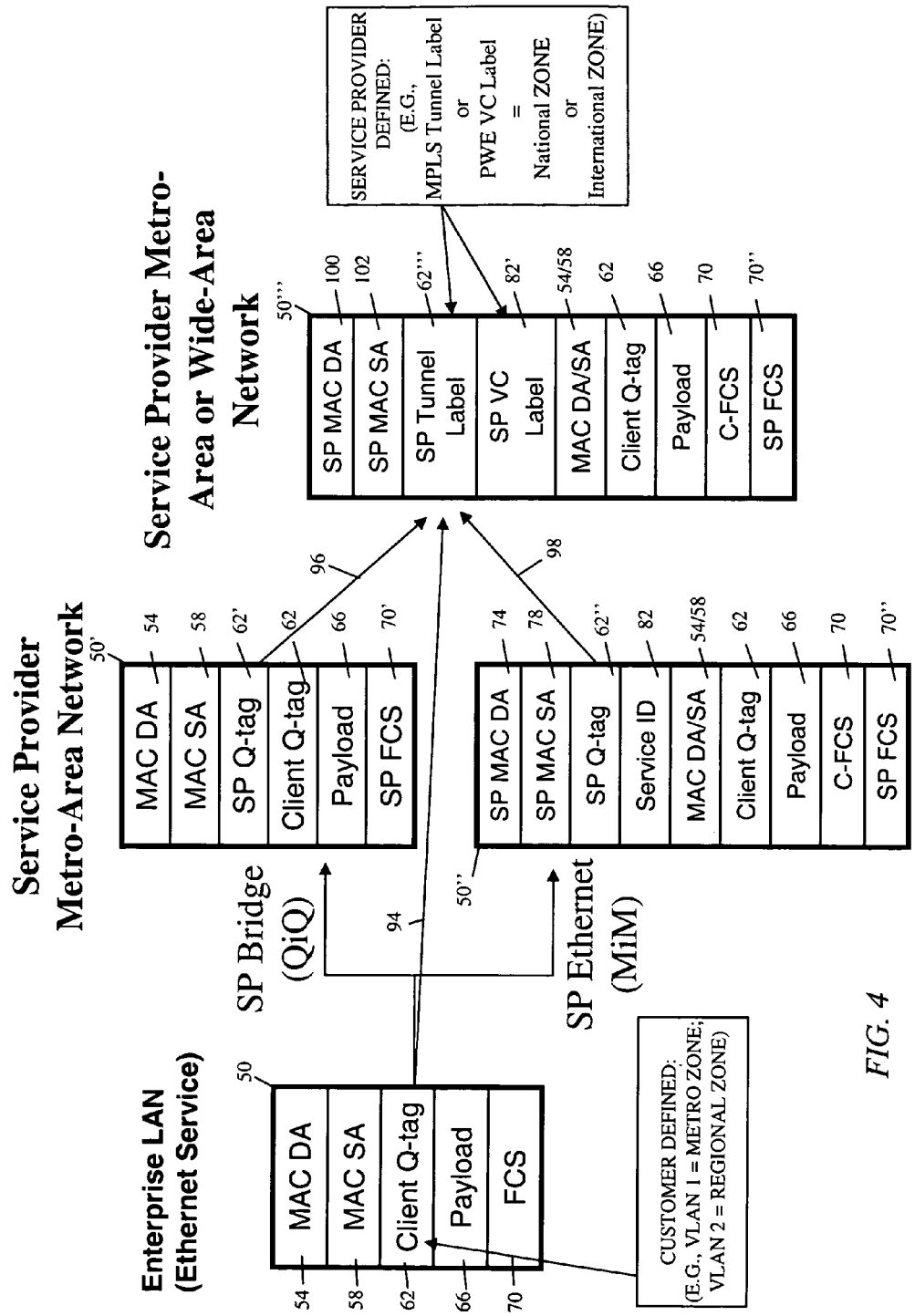
FIG. 4 is a diagram illustrating other embodiments of a packet structure for conveying zoning information over metro area and wide area networks in accordance with the principles of the invention.

FIG. 4 shows various embodiments for signaling a zone indicator using MPLS or MPLS in combination with PWE. Various embodiments shown for transporting a service packet 50 with a zone indicator over a SP MAN are illustrated by arrows 94, 94', and 94". Embodiments denoted by arrows 94' and 94" correspond to the SP Bridge (QiQ) and SP Ethernet (MiM) mechanisms, respectively, described above in connection with FIG. 3. For the embodiment denoted by the arrow 94, the near-end NE 14 of the SP MAN encapsulates the contents of packet 50 within a packet 50'''. The packet 50''' includes an SP MAC destination address 100, an SP MAC source address 102, an SP Tunnel Label 62''', an optional SP VC label 82', and an SP FCS 70". In the construction of the packet 50''', the SP MAC destination and source addresses 100, 102, the SP Tunnel Label 62''', and SP VC label 82' are added at the front of the header of the packet 50 and the SP FCS 70" is appended to end of the packet 50. The SP Tunnel Label 62''', e.g., an MPLS tunnel label, includes the zone indicator for identifying the zone reach for the packet 50'''. The SP VC label 82', e.g., a PWE VC label, includes an identity of the service instance. An MPLS Tunnel Label can be used with or without a PWE VC label. For embodiments not having a PWE VC label, the identity of the service instance can be incorporated in the MPLS Tunnel Label (with the zone indicator).

Also shown in FIG. 4 are embodiments (denoted by arrows 96, 98) for transporting the service packet 50 over an SP MAN, using one of the SP Bridge QiQ or SP Ethernet MiM mechanisms, and subsequently over an SP WAN using an SP tunnel label, with or without an SP VC label, as previously described. In the construction of the packet 50''', the SP Q-tag (62' of packet 50' or 62" of packet 50"), which conveys the zone indicator, is transformed into the SP Tunnel Label 62''' with the zone indicator. In these embodiments, the zone indicator typically identifies a national, continental, or global zone. For an SP Ethernet MiM packet 50", the Service ID 82 is transformed into the SP VC label 82' conveying the identity of the service instance. Again, for embodiments not having a SP VC label, the identity of the service instance can be incorporated in the SP Tunnel Label (with the zone indicator).

In other embodiments, the packets of the service traffic do not have an explicit zone indicator. In these embodiments, each node in the path of the service traffic maintains a data structure, such as a table, that associates services to zone. Each packet passing through the nodes includes information identifying the service with which that packet is associated. The nodes use this service-identifying information to query the data structure and retrieve the zone associated with the service. With this zone information, the nodes determine whether to restrict or forward the packets to another zone.

The principles of the invention can be used to produce predictability and a pricing structure for IP services by combining IP with Ethernet (i.e., IP over Ethernet; that is, an IP packet uses IP at the network layer 3 and uses Ethernet MAC at the layer 2). When combined with Ethernet, IP packets to be transported over an IP network have those Ethernet fields (described above) including the q-tag. Accordingly, IP packets include a zone indicator that can be used by the nodes in the IP network to route and restrict the packets to their appropriate zone. The ability to establish zone-based pricing structure for IP services enables the development of a common set of zoning metrics for L2 (Ethernet) and L3 (TCP/IP) services.

The present invention also facilitates the design (i.e., or engineering) of the service provider's network. By the generation of zones, a service provider is able to determine its costs for carrying service traffic in that zone. Costs are typically associated with distance (e.g., length of copper wire, optical fiber, number of network elements, etc.) and zones define boundaries within which the evaluation of costs can be constrained. Costs for zones are thus made predictable. After costs for a zone are understood, the service provider can establish pricing for packet traffic within that zone and between zones. A predictable pricing structure leads to predictable revenues and margins. Further, Management Information Base (MIB) objects are presently defined for Ethernet, Fiber Channel, and IP services and for which nodes can measure values based on the service traffic arriving at and leaving from that node. The nodes can correlate these performance metrics to a particular zone (based on the zone associated with the service traffic). Thus, service providers are able to monitor traffic volumes for each supported zone, and to determine from the performance metrics whether a particular service is operating in accordance with a service level agreement. Further, zoning provides a mechanism for containing the use or consumption of network resources. For example, broadcasts can be confined to a particular zone.

Figure 5:
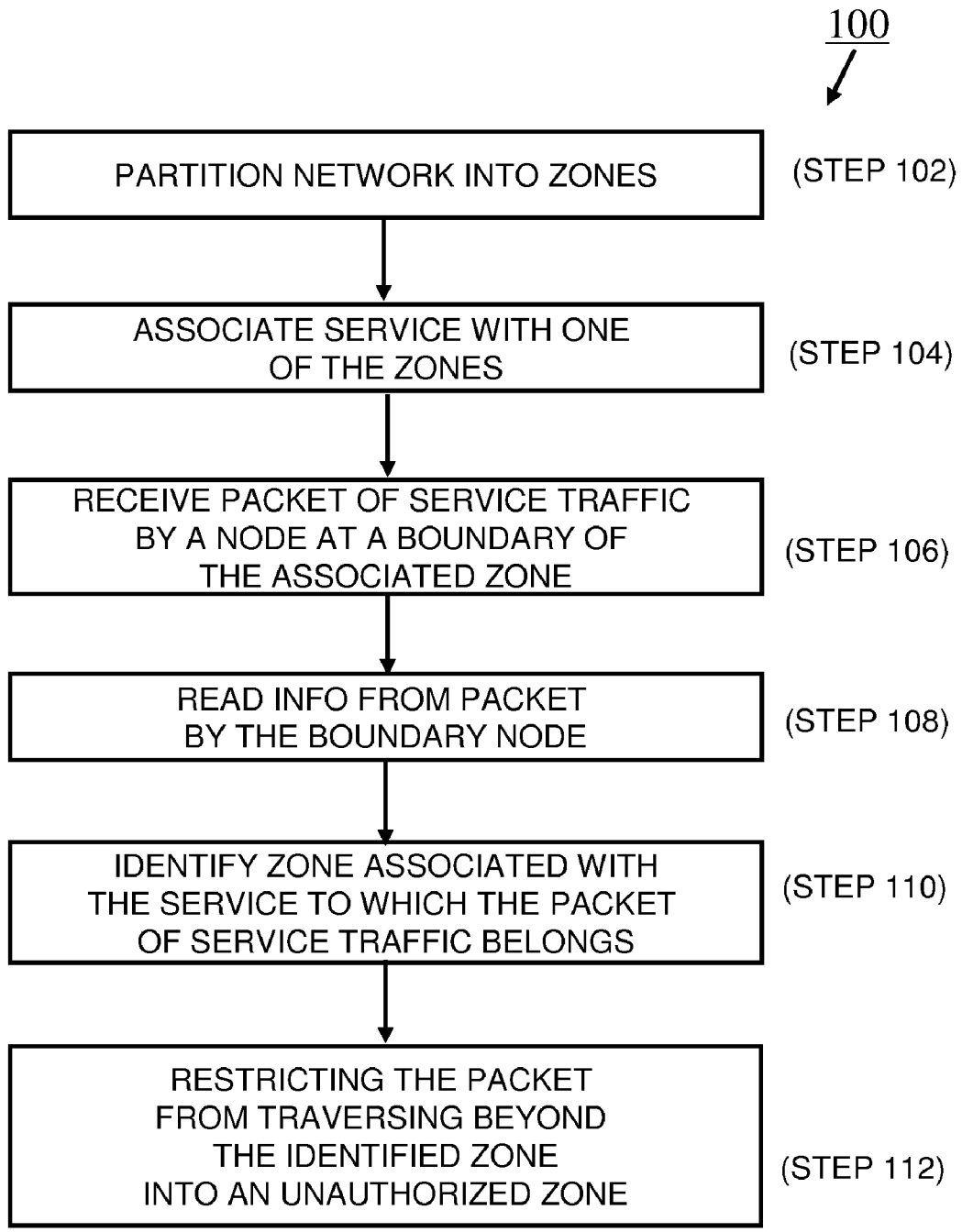
FIG. 5 is a flow diagram illustrating an embodiment of a process for establishing zone-based pricing for a service transported over a network.

FIG. 5 shows an embodiment of a process 100 for establishing zone-based pricing for a service transported over a network. At step 102, the network is partitioned into zones. The service is associated (step 104) with one of the zones to establish an extent to which packets of service traffic belonging to the service are permitted to traverse the network for a given price. A node connected to the network at a boundary of the zone associated with the service receives (step 106) a packet of service traffic belonging to the service. The node reads (step 108) information from the packet of service traffic and, in response to reading the information from the packet, identifies (step 110) the zone associated with the service to which the packet of service traffic belongs. The node restricts (step 112) the packet from traversing beyond the identified zone into an unauthorized zone.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for establishing zone-based pricing for a service transported over a network, the method comprising:
    partitioning the network into zones;
    associating the service with one of the zones to establish an extent to which packets of service traffic belonging to the service are permitted to traverse the network for a given price;
    receiving, at a node connected to the network at a boundary of the zone associated with the service, a packet of service traffic belonging to the service, the packet having an Ethernet VLAN (Virtual Local Area Network) tag;
    reading, by the node, the Ethernet VLAN tag from the packet of service traffic;
    identifying, by the node, the zone associated with the service to which the packet of service traffic belongs from the Ethernet VLAN tag read from the packet; and
    restricting the packet, by the node, from traversing beyond the zone identified from the Ethernet VLAN tag into an unauthorized zone.

2. The method of claim 1, further comprising maintaining by the node a data structure that associates the service with the zone, and querying the data structure using the Ethernet VLAN tag to determine the zone to which the service traffic is permitted to travel.

3. The method of claim 1, wherein the Ethernet VLAN tag has data bits for identifying a virtual local area network, a portion of the data bits being used to convey service-identifying information.

4. The method of claim 3, further comprising the step of adding a second VLAN identifier to the packet of service traffic, by the node, to serve as a zone indicator.

5. The method of claim 1, further comprising adding a zone indicator to the packet of service traffic based on the Ethernet VLAN tag read from the packet of service traffic.

6. The method of claim 5, wherein the zone indicator is added to the packet of service traffic by the node.

7. The method of claim 5, wherein the step of adding a zone indicator to the packet of service traffic includes adding by the node the Ethernet VLAN tag, the Ethernet VLAN tag having data bits for identifying a virtual local area network, a portion of the data bits being used to convey the zone indicator.

8. The method of claim 1, further comprising establishing the given price for the service based on a distance of the zone from a source of the service traffic.

9. The method of claim 1, further comprising associating a first portion of the service traffic with a first zone and a second portion of the service traffic with a second zone.

10. The method of claim 1, wherein the network is a connectionless network and the connectionless network is one of an Internet Protocol (IP) network, a private IP network, and a private service provider Ethernet network.

11. The method of claim 1, wherein the service is an Ethernet service.

12. The method of claim 1, wherein the network is one of a connectionless packet network, a circuit-oriented packet network, and a circuit-oriented optical network.

13. The method of claim 1, further comprising adding a service identifier to the packet of service traffic by the node for identifying the service with which the packet of service traffic is associated.

14. The method of claim 1, further comprising computing a performance metric at the node and correlating the performance metric to the zone.

15. The method of claim 1, further comprising establishing the given price for the service based on operating costs for transmitting the service traffic from a source of the service traffic to the zone.

16. The method of claim 1, wherein the zone associated with the service is a first zone, and further comprising the steps of:
    associating the service with a second zone;
    transmitting the packet of service traffic through the first zone into the second zone, the packet of service traffic being transmitted through the first zone at a first bandwidth rate and within the second zone at a second bandwidth rate.

17. The method of claim 16, wherein the given price is a first price established for the first zone, and further comprising establishing a second price for transmitting the service traffic within the second zone.

18. The method of claim 1, further comprising forwarding the packet, by the node, towards a destination within the identified zone.

19. The method of claim 1, wherein the service is an Internet Protocol (IP) Service.

20. The method of claim 1, wherein a customer of the service provides the Ethernet VLAN tag.

21. The method of claim 1, wherein the Ethernet VLAN tag is a Q-tag.

22. The method of claim 1, further comprising encapsulating the packet with the Ethernet VLAN tag, the encapsulated packet including a service provider tag corresponding to a zone indicator for identifying a zone for the packet.

23. The method of claim 22, wherein the encapsulated packet is a service provider (SP) Bridge QiQ packet.

24. The method of claim 22, wherein the encapsulated packet is a service provider (SP) Ethernet MiM packet.

25. The method of claim 22, wherein the encapsulated packet is a Multi-protocol Label Switch (MPLS) packet.

* * * * *